(12) United States Patent
Akimune et al.

(10) Patent No.: US 6,447,944 B1
(45) Date of Patent: Sep. 10, 2002

(54) SOLID ELECTROLYTE, METHOD OF PRODUCING SAME AND FUEL CELL USING SAME

(75) Inventors: Yoshio Akimune, Ibaraki; Mikiya Shinohara; Fumio Munakata, both of Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 92 days.

(21) Appl. No.: 09/642,652

(22) Filed: Aug. 22, 2000

(30) Foreign Application Priority Data

Aug. 30, 1999 (JP) .......................................... 11-243819
Oct. 29, 1999 (JP) .......................................... 11-308537

(51) Int. Cl.$^7$ ................................................ H01M 8/10

(52) U.S. Cl. ............................ 429/33; 429/30; 429/46; 429/304; 252/62.2

(58) Field of Search ........................... 429/33, 304, 30, 429/46; 252/62.2

(56) References Cited

U.S. PATENT DOCUMENTS 6,337,006 B1 * 1/2002 Fujita et al. ................. 204/421

FOREIGN PATENT DOCUMENTS

| JP | 57-50748 | 10/1982 |
| JP | 57-50749 | 10/1982 |
| JP | 62-45191 | 9/1987 |
| JP | 5-225820 | 9/1993 |

OTHER PUBLICATIONS

Yamaji et al. "Compatibility of La0.9Sr0.1Ga0.8Mg0.2O2.85 as the electrolyte for SOFCs" Solid State Ionics 108 (1998), pp. 415–421.*

Tannenberger et al.; "Etude D'électrolytes Solides À Base D'oxyde De Zirconium Pour Piles À Combustible"; Institut Battelle, Centre de Recherches de Genéve; Proc. Int'l Etude Piles Combust., 1965, pp. 19–26.

Takahashi et al.; "High Oxide Ion Conduction in Sintered Oxides of the System $Bi_2O_3$–$Y_2O_3$"; Journal of Applied ELectrochemistry 5; Chapman and Hall Ltd.; 1975; pp. 187–195.

Kudo et al.; "Mixed Electrical Conduction in the Fluorite–Type $Ce_{1-x} Gd_xO_{2-x/2}$", J. Electrochem. Soc.; Hitatshi Limited; vol. 123, No. 3; Mar. 1976. pp.415–419.

Ishihara et al.; "Doped $LaGaO_3$ Perovskite Type Oxide as a New Oxide Ionic Conductor"; Journal of American Chemical Society; American Chemical Society; vol. 116, No. 9; 1994; pp. 3801–3803.

Feng et al,; "A Superior Oxide–ion Electrolyte"; Eur. J. Solid State Inorg. Chem.; Gauthier–Villars; 1994; pp. 663–672.

Japanese Industrial Standard; "Testing Method for Flexural Strength (Modulus of Rupture) of High Performance Ceramics", Japanese Standards Association; 1981; pp. 1–5.

Murray et al.; "A Direct–Methane Fuel Cell With A Ceria–Based Anode", Nature; vol. 400; Aug. 12, 1999; www.nature.com; pp. 649–651.

Ishihara et al.; "Intermediate Temperature Solid Oxide Fuel Cells Using a New $LaGaO_3$ Based Oxide Ion Conductor"; Journal of Electrochemical Society; The Electrochemical Society, Inc.; vol. 145 No. 9; Sep. 1998; pp. 3177–3183.

Morse et al.; "A Novel Thin Film Solid Oxide Fuel Cell for Microscale Energy Conversion"; SPIE Conference on Micromached Devices and Components V; SPIE; vol. 3876; Sep. 1999; pp. 223–226.

* cited by examiner

Primary Examiner—Laura Weiner
(74) Attorney, Agent, or Firm—Foley & Lardner

(57) ABSTRACT

A solid electrolyte used in a cell and represented by the following formula:

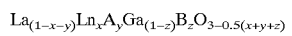

$$La_{(1-x-y)}Ln_xA_yGa_{(1-z)}B_zO_{3-0.5(x+y+z)}$$

where Ln is at least one element selected from the group consisting of Gd, Sm and Nd; A is Ba; B is Mg; x is 0.1; y is 0.1; and z is 0.2, wherein the solid electrolyte is formed of particles whose means diameter is within a range of from 4 to 10 $\mu$m, the solid electrolyte being produced by a method comprising: (a) mixing lanthanum oxide, gallium oxide, oxide of at least one rate earth element selected from the group consisting of Gd, Sm and Nd, barium oxide and magnesium oxide to form a mixture; (b) firing the mixture in air at a temperature ranging from 1100 to 1200° C. for a time ranging from 2 to 8 hours to accomplish synthesizing a compound material; (c) pulverizing the compound material; (d) compacting the pulverized compound material; (e) adjusting mean diameter of the pulverized compound material within a range of from 0.5 to 0.8 $\mu$m; and (f) sintering the compacting compound material in air at a temperature ranging from 1400 to 1500° C. for a time ranging from 2 to 8 hours to form the solid electrolyte.

8 Claims, 1 Drawing Sheet

SOLID ELECTROLYTE, METHOD OF PRODUCING SAME AND FUEL CELL USING SAME

BACKGROUND OF THE INVENTION

This invention relates to improvements in a solid electrolyte, in a method of producing the solid electrolyte and in a fuel cell using the solid electrolyte, and more particularly to the solid electrolyte which is active to maintain high ionic conductivity at low temperatures and stabilized in ionic conductivity, the method of producing the solid electrolyte and the fuel cell using the solid electrolyte.

Recently, researches and developments have been positively proceeded on solid electrolytes because the solid electrolytes are safe from the viewpoint of liquid leak and specified ions being conducted, so that they are very effective as electronic materials of a variety of devices such as cells and gas sensors. Particularly, developments have been proceeded on ceramic solid electrolyte fuel cells called SOFC (solid oxide fuel cell). A fuel cell having a zirconia-based ceramic solid electrolyte has made an operational achievement in which power generation of several kW is maintained for several thousands hours. It is supposed that the SOFC is operated at high temperatures higher than 1000° C., and therefore hydrocarbon fuels can be reformed inside the fuel cell (accomplishing so-called internal reforming) thereby obtaining a high combustion or conversion efficiency higher than 60%.

In general, the SOFC is composed of a solid electrolyte, an anode and a cathode. All such materials are required to be stable in oxidizing and reducing atmosphere, to have suitable ionic conductivity, and to have their thermal expansion coefficients close to each other. Additionally, the materials of the anode and the cathode are required to be so porous that gas is permeable. Further, the materials of the SOFC are desired to be high in strength and stiffness, to be inexpensive, to be operable at temperatures as low as possible (as basic requirements for electric conductive materials) from the viewpoint of safe during operation of the SOFC.

Presently, stabilized $ZrO_2$ is in the mainstream of the materials of the solid electrolytes, in which oxide of bivalent alkaline earth metal such as CaO, MgO, $Sc_2O_3$ or rare earth oxide such as $Y_2O_3$ are used as a stabilizer. $ZrO_2$ doped with CaO (oxide of alkaline earth metal) exhibits an ionic conduction characteristic value of 0.01 $(\Omega cm)^{-1}$. Additionally, H. Tannenberger et al has reported in "Proc. Int'l Etude Piles Combust, 19–26 (1965)" that the ionic conductivity of $ZrO_2$ doped with one of $Y_2O_3$, $Yb_2O_3$, and $Gd_2O_3$ is around a range of from $1\times10^{-1}$ to $1\times10^{-2}$ S/cm at 800° C., and decreases to a value lower than $2\times10^{-2}$ S/cm when temperature is below 650° C.

Concerning zirconia stabilized by rare earth and alkaline earth compounds, they are disclosed in Japanese Patent Publication No. 57-50748 and Patent Publication No. 57-50749.

Additionally, stabilized bismuth oxide is also used as solid electrolyte. A high temperature phase (δ phase) of $Bi_2O_3$ has a deficiency fluorite structure ($Bi_4O_6\square_2$ where $\square$ is vacancy) and low in activation energy for oxide ion movement thereby exhibiting a high oxide ion conductivity. The high temperature phase is stabilized also in a low temperature region by forming solid solution of rare earth oxide, thus exhibiting a high oxygen ion conductivity. T. Takahashi et al reports in "J. Appl. Electrochemistry, 5(3), 187–195 (1975)" that bismuth oxide stabilized by oxide of rare earth element, for example, $(Bi_2O_3)_{1-x}(Y_2O_3)_x$ exhibits ionic conductivity characteristics of 0.1 $(\Omega cm)_{-1}$ at 700° C., 0.01 $(\Omega cm)^{-1}$ at 500° C. which are higher 10 to 100 times than stabilized zirconia.

Japanese Patent Publication No. 62-45191 recites that a mixture of stabilized bismuth and stabilized zirconium oxide exhibits an ionic conductivity of 0.1 $(\Omega cm)^{-1}$ at 700° C. Accordingly, it may be expected that a high ionic conductivity can be obtained in a temperature region lower than 1000° C. However, bismuth oxide is reduced into bismuth in metal state under a reduction atmosphere thereby exhibiting electronic conductivity, and therefore it is difficult to directly use the mixture as solid electrolyte.

Additionally, ceria-based solid solution is also used as solid electrolyte. $CeO_2$ has a fluorite-type cubic structure in a temperature ranging from loom temperature to melting point. Kudo and H. Obayashi et al reports in "J. Electrochem., Soc., 123[3] 416–419, (1976)" that solid solution is formed in a wide temperature region by adding rare earth oxide or CaO to $CeO_2$.

$CeO_2$—$Gd_2O_3$-based solid electrolyte which is in the main stream compound of recent researches and developments is represented by $Ce_{1-x}Gd_xO_{2-x/2}$ in which vacancy of oxygen is formed. In such compound, the valency of Ce is changed and therefore cerium oxide is reduced into cerium in metal state under a reduction atmosphere similarly to bismuth oxide, thereby exhibiting electronic conductivity. Accordingly, it is difficult to directly use such compound as solid electrolyte.

As other materials usable in a low temperature region, attention has been paid on research and development of perovskite compound. This compound is composed of $ABO_3$ having two ions (A and B) and has such examples as $BaCe_{0.9}Gd_{0.1}O_3$, $La_{0.8}Sr_{0.1}Ga_{0.8}Mg_{0.2}O_3$, $CaAl_{0.7}TiO_3$ and $SrZr_{0.9}Sc_{0.1}O_3$. Additionally, $La_{1-x}Srx\ Ga_{1-y}Mg_yO_3$ is reported by T. Ishihara et al reports in "J. Am. Chem. soc., 116, 3801–03 (1994) and by M. Feng and J. B. Goodenough reports in "Eur. J. Solid. State Inorg. Chem. t31, 663–672 (1994)".

SUMMARY OF THE INVENTION

However, such zirconia is low in ionic conductivity in a low temperature region, and electronic conductivity of bismuth oxide and ceria is in the reduction atmosphere. Accordingly, they are not suitable for solid electrolyte of fuel cell in a low temperature region. Additionally, although perovskite compound is high in ionic conductivity in a low temperature region as compared with other compounds, it is lowered in oxygen ion conductivity in such a low temperature region under Hall effect.

In the above-discussed fuel cells, power output of a single cell is limited to about 1V, and therefore it is required to obtain a high power output that a fuel cell takes a laminated structure including a plurality of single cells. Such a ceramic fuel cell having the laminated structure becomes large-sized, which makes it difficult to select structures (for example, tube-type or plate-type) of parts and to produce a large-sized fuel cell. A container such as a combustor main body of such a large-sized ceramic fuel cell requires to effectively use metal parts formed of ferrite stainless steel or the like from the economical view points. In order to effectively use metal, the fuel cell requires stabilized solid electrolyte materials which are active throughout a wide temperature region, for example, in a low temperature region (600 to 800° C.) so as to have an ionic conductivity generally equal to that in a high temperature region higher than 1000° C.

Additionally, solid electrolyte has crystal which is liable to break at temperatures around 650° C. Accordingly, it has been required to establish a technique for stabilizing crystal phase of solid electrolyte in a wide temperature region and to prevent solid electrolyte from lowering in strength at high temperatures. In this regard, Japanese Patent Provisional Publication No. 5-225820 discloses that $AlO_3$ is added for the purpose of stabilizing crystal structure of the solid electrolyte.

It is, therefore, an object of the present invention to provide an improved solid electrolyte and an improved method of producing the solid electrolyte, which can overcome drawbacks encountered in conventional techniques in connection with solid electrolyte.

Another object of the present invention is to provide an improved solid electrolyte which is sufficiently active throughout a wide temperature region including a relatively low temperature of around 600° C., and high in ionic conductivity and stabilized.

A further object of the present invention is to provide an improved solid electrolyte which is active in a low temperature range around 600° C. and high in ionic conductivity, while being able to prevent Hall effect from decreasing thereby improving its transference number.

A still further object of the present invention is to provide an improved method of producing a solid electrolyte which is sufficiently active throughout a wide temperature region including a temperature range around 600° C., and high in ionic conductivity and stabilized.

A still further object of the present invention is to provide an improved fuel cell including a solid electrolyte which is sufficiently active throughout a wide temperature region including a temperature range around 600° C., and high in ionic conductivity and stabilized.

An aspect of the present invention resides in a solid electrolyte represented by the following formula:

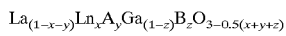

$$La_{(1-x-y)}Ln_xA_yGa_{(1-z)}B_zO_{3-0.5(x+y+z)}$$

where Ln is rare earth element; A is at least one element selected from the group consisting of Sr, Ba and Ca; B is at least one of Mg and Zn; x is a number ranging from 0.05 to 0.15; y is a number ranging from 0.05 to 0.15; and z is a number ranging from 0.05 to 0.25.

Another aspect of the present invention resides in a method of producing a solid electrolyte, comprising: (a) mixing gallium oxide, oxides of rare earth elements, oxide of alkaline earth element, at least one of zinc oxide and magnesium oxide to form a mixture; (b) firing the mixture at a temperature ranging from 1050 to 1200° C. for a time ranging from 2 to 10 hours to accomplish synthesizing a compound material; (c) pulverizing the compound material; and (d) compacting the pulverized compound material; and (e) sintering the compacting compound material to form the solid electrolyte.

A further aspect of the present invention resides in a solid electrolyte represented by the following formula:

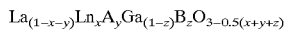

$$La_{(1-x-y)}Ln_xA_yGa_{(1-z)}B_zO_{3-0.5(x+y+z)}$$

where Ln is at least one element selected from the group consisting of Gd, Sm and Nd; A is Ba; B is Mg; x is 0.1; y is 0.1; and z is 0.2, wherein the solid electrolyte is formed of particles whose means diameter is within a range of from 4 to 10 μm, the solid electrolyte being produced by a method comprising: (a) mixing lanthanum oxide, gallium oxide, oxide of at least one rate earth element selected from the group consisting of Gd, Sm and Nd, barium oxide and magnesium oxide to form a mixture; (b) firing the mixture in air at a temperature ranging from 1100 to 1200° C. for a time ranging from 2 to 8 hours to accomplish synthesizing a compound material; (c) pulverizing the compound material; (d) compacting the pulverized compound material; (e) adjusting mean diameter of the pulverized compound material within a range of from 0.5 to 0.8 μm; and (f) sintering the compacting compound material in air at a temperature ranging from 1400 to 1500° C. for a time ranging from 2 to 8 hours to form the solid electrolyte.

A still further aspect of the present invention resides in a fuel cell comprising a solid electrolyte represented by the following formula:

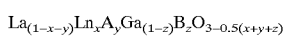

$$La_{(1-x-y)}Ln_xA_yGa_{(1-z)}B_zO_{3-0.5(x+y+z)}$$

where Ln is rare earth element; A is at least one element selected from the group consisting of Sir, Ba and Ca; B is at least one of Mg and Zn; x is a number ranging from 0.05 to 0.15; y is a number ranging from 0.05 to 0.15; and z is a number ranging from 0.05 to 0.25.

DETAILED DESCRIPTION OF THE INVENTION

Figure 1:
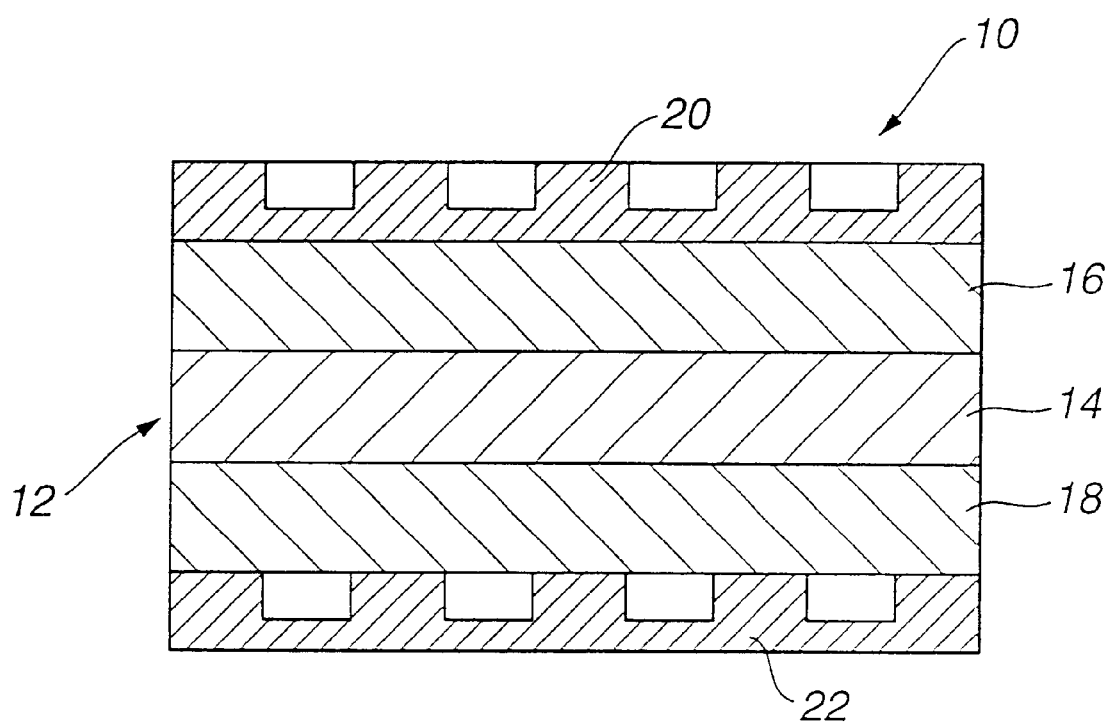
FIG. 1 is a schematic sectional view of a fuel cell including solid electrolyte according to the present invention.

According to the present invention, a solid electrolyte is represented by the following formula:

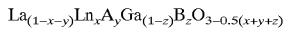

$$La_{(1-x-y)}Ln_xA_yGa_{(1-z)}B_zO_{3-0.5(x+y+z)}$$

where Ln is rare earth element; A is at least one element selected from the group consisting of Sr, Ba and Ca; B is at least one of Mg and Zn; x is a number ranging from 0.05 to 0.15; y is a number ranging from 0.05 to 0.15; and z is a number ranging from 0.05 to 0.25.

The rare earth element is preferably at least one element selected from the group consisting of Y, Yb, Gd and Sm.

With such a composition, the solid electrolyte is very high in ionic conductivity at a low temperature range (for example, around 1600° C.), stabilizing a composition region in which high ionic conductivity is exhibited under the effect of difference in atomic radius of added elements. Concerning durability of the solid electrolyte, thermal durability can be improved since ionic conductivity does not lower corresponding to change in composition.

In the above formula, x is the number ranging from 0.05 to 0.15. If x is smaller than 0.05, firing temperature is required to be high thereby resulting in abnormal growth of grain. If x exceeds 0.15, Hall effect is high thereby lowering effective ionic conductivity.

Additionally, y is the number ranging from 0.05 to 0.15. If y is smaller than 0.05, the solid electrolyte is low in ionic conductivity. If y exceeds 0.15, Hall effect is high thereby lowering effective ionic conductivity.

Further, z is the number ranging from 0.05 to 0.25. If z is smaller than 0.05, the solid electrolyte is low in ionic conductivity. If z exceeds 0.25, Hall effect is high thereby lowering effective ionic conductivity, similarly to the above-mentioned y.

It will be understood that methods of synthesizing the solid electrolyte as represented by the above formula are not limited to particular ones, so that such solid electrolyte can be synthesized by known and conventional techniques in which reaction sintering in solid phase resides in the center of techniques for producing zirconia material.

In concrete, lanthanum oxide, gallium oxide, oxides of alkaline earth elements, and zinc oxide and/or magnesium oxide, and rare earth oxide as stabilizer (at least one compound selected from $Y_2O_3$, $Gd_2O_3$, $Yb_2O_3$, $Sm_2O_3$ and $Nd_2O_3$) are weighed to result in a solid electrolyte or matrix represented by the formula $La_{(1-x-y)}Ln_xA_yGa_{(1-z)}B_zO_{3-0.5(x+y+z)}$ as shown in Tables, in which the rate earth oxide is ranging from 5 to 15 mole %, A element (at least one element selected from the group consisting of Sr, Ba and Ca) is ranging from 5 to 15 mole %, B element (Mg and/or Zn) is ranging from 5 to 25 mole %.

Subsequently, the mixture is pulverized in alcohol in a ball mill so as to have mean diameter or particle size of not larger than 2 μm, thereby obtaining slurry. At this time, the mean diameter of not larger than 2 μm is preferable for the following reasons: If the mean diameter exceeds 2 μm, solid phase reaction becomes insufficient in a firing and synthesizing process, or solid solution concentration becomes ununiform, thereby making a characteristic value (or ionic conductivity) unstable.

The slurry is dried and then fired in the air or atmosphere at a temperature ranging from about 1050 to 1200° C. for a time ranging from 2 to 10 hours, in which solid phase reaction is made to form reacted solid material. The reacted solid material is again pulverized in alcohol in a ball mill so as to have means particle size of not larger than 0.6 μm. The pulverized solid material is dried by a spray drier thereby obtaining a compound powder or gallium oxide-based solid solution $La_{(1-x-y)}Ln_xA_yGa_{(1-z)}B_zO_{3-0.5(x+y+z)}$. This compound powder preferably has particle size or diameter ranging from 0.5 to 0.8 μm, the particle size being measured by using a laser diffraction and scattering particle size distribution analyzer (LA920) produced by Horiba Ltd. If the particle size is smaller than 0.5 μm, compacting or pressing can be accomplished on the compound powder. If the particle size exceeds 0.8μ, sintering becomes insufficient so that vacancy is left in the solid electrolyte, resulting in strength lowering.

For example, the compound powder is pressed in a mold and compacted isostatically pressed at a pressure ranging from 2 to 4 ton/cm$^2$ and sintered in the air and atmospheric at a temperature ranging from 1350 to 1500° C. for a time ranging from 2 to 8 hours, thus obtaining a sintered solid electrolyte. In this sintering, it is preferable to use a setter formed of the same material as the sintered solid electrolyte and a sagger formed of alumina, in which the setter may be formed of alumina.

Crystal grains of the sintered solid electrolyte preferably have mean diameter ranging from 2 to 10 μm. This mean diameter or particle size is determined as follows: A photograph of an electron microscope for the crystal grains is taken. Parallel ten straight lines are drawn on the photograph in a manner to cross the images of crystal grains. Then, the diameter or particle size of the crystal grains are read to determine the mean diameter. This is called a line intercept method.

By virtue of the mean diameter ranging from 2 to 10 μm, dense solid electrolyte can be obtained. If the mean diameter exceeds 10 μm, strength of the solid electrolyte lowers. If the means particle size is not larger than 2 μm, a section which has not yet sintered is left in the sintered solid electrolyte so that gas is permeable therethrough, and therefore the solid electrolyte cannot serve as a ceramic partition wall.

Cells using the solid electrolyte of the present invention can exhibit a very high ionic conductivity at low temperatures, so that operating temperature of the cells can be lowered. Exhibition of the very high ionic conductivity at the low temperatures makes it possible to accomplish measurement of exhaust gas composition in an exhaust gas pipe of an automotive vehicle, for example, at engine starting at which exhaust gas temperature is low, in case that the solid electrolyte is used as a part of an exhaust gas composition sensor.

The solid electrolyte of the present invention is used in a fuel cell whose one example is shown in FIG. 1.

Fuel cell 10 includes solid electrolyte 14 of the present invention. Air electrode 16 and fuel electrode 18 are formed at the opposite sides of solid electrolyte 14. The solid electrolyte, and air and fuel electrodes constitute single cell unit 12. Interconnection members 20, 22 are formed at the opposite sides of single cell unit 12. It will be understood that single cell units 12 are laminated one upon another through interconnection member 20, 22 so as to constitute a fuel cell assembly.

EXAMPLES

The present invention will be more readily understood with reference to the following Examples in comparison with Comparative Examples; however, these Examples are intended to illustrate the invention and are not to be construed to limit the scope of the invention.

Examples 1 to 22 and Comparative Examples 1 to 13

Gallium oxide powder (3N=purity of 99.9%; produced by Koujunndo Chemical Co., Ltd.) available on the market; $SrCO_3$, $BaCO_3$, $CaCO_3$, MgO, and ZnO (reagent 3N=purity of 99.9%; produced by Koujunndo Chemical Co., Ltd.); and oxides of rare earth elements ($La_2O_3$, $Gd_2O_3$, $Y_2O_3$, $Yb_2O_3$, $Sm_2O_3$, $Nb_2O_3$) (Ru grade=particle size of about 1 μm and purity higher than 99.9%; produced by Shin-Etsu Chemical Co. Ltd.) were blended as raw materials in certain mole ratios to form a mixture which would result in a solid electrolyte or matrix represented by the formula $La_{(1-x-y)}Ln_xA_yGa_{(1-z)}B_zO_{3-0.5(x+y+z)}$ as shown in Tables 1, 2 and 3. The mixture was pulverized in alcohol in a ball mill for 24 hours so that means diameter of particle size of the mixture became not larger than 2 μm, thus forming a slurry. Consequently, the slurry was dried and then subjected firing reaction at 1150° C. for 4 hours, thereby obtaining reacted solid material or reaction product. The reaction product was again pulverized in alcohol in a ball mill so that the mean diameter of the pulverized reaction product was not larger than 0.6 μm. The pulverized reaction product was dried by a spray drier or the like, thus obtaining powder ($LaGaO_3$). The powder was pressed in a metal mold and compacted at 2 ton/cm$^2$ by isostatic pressing and then sintered at 1450° C. for 6 hours as shown in Tables 1, 2 and 3, thereby obtaining a solid electrolyte represented by the formula $La_{0.9-x}Sr_{0.1}Ga_{0.8}MgO_{2.85-0.5x}$.

Examples 23 to 37 and Comparative Examples 14 to 24

Raw materials like those in Example 1 were blended in certain mole ratios to form a mixture which would result in a solid electrolyte or matrix represented by the formula $La_{(1-x-y)}Ln_xA_yGa_{(1-z)}B_zO_{3-0.5(x+y+z)}$ as shown in Tables 4 and 5, in which Ln was one of Gd, Sm and Nd; A element was at least one of Sr, Ba and Ca. The mixture was processed similarly to Example 1 under conditions shown in Tables 4 and 5. As a result, a solid electrolyte represented by $La_{0.9-y}Ln_{0.1}A_yGa_{0.8}Mg_{0.2}O_{2.85-0.5y}$ was obtained.

Examples 38 to 47 and Comparative Examples 25 to 30

Raw materials like those in Example 1 were blended in certain mole ratios to form a mixture which would result in a solid electrolyte or matrix represented by the formula $La_{(1-x-y)}Ln_xA_yGa_{(1-z)}B_zO_{3-0.5(x+y+z)}$ as shown in Table 6, in which Ln was one of Gd, Sm and Nd; and B element was Mg and/or Zn. The mixture was processed similarly to Example 1 under conditions shown in Table 6. As a result, a solid electrolyte represented by the formula $La_{0.8}Ln_{0.1}Ba_{0.1}Ga_{0.8}B_{0.2}O_{2.8}$ was obtained.

Examples 48 to 59 and Comparative Examples 33 to 44

Raw materials like those in Example 1 were blended in certain mole ratios to form a mixture which would result in a solid electrolyte or matrix represented by the formula $La_{(1-x-y)}Ln_xA_yGa_{(1-z)}B_zO_{3-0.5(x+y+z)}$ as shown in Tables 7 and 8, in which Ln was one of Gd, Sm and Nd. The mixture was processed similarly to Example 1 under conditions shown in Tables 7 and 8, in which firing was accomplished at a temperature ranging from 1050 to 1200° C. for a time ranging from 2 to 10 hours; and sintering was accomplished at a temperature ranging from 1350 to 1500° C. for a time ranging from 2 to 8 hours. As a result, a solid electrolyte represented by $La_{0.9}Ln_{0.1}Ba_{0.1}Ga_{0.8}Mg_{0.2}O_{2.8}$ was obtained.

EXPERIMENT

The solid electrolytes obtained in Examples 1 to 59 and Comparative Examples 1 to 44 were subjected to measurements of characteristic values, i.e., ionic conductivity and transference number in order to evaluate the characteristics of the solid electrolytes. The results of these measurements are shown in Tables 1 to 8. After these measurements, the solid electrolytes were subjected to a durability test in which each solid electrolyte was maintained at 800° C. for 100 hours in a furnace, while electric current of 0.1 mA was flown through the solid electrolyte.

The measurements of the characteristic values were conducted on the solid electrolyte at initial period (before thes durability test) and the solid electrolyte after the durability test, as follows:

a) Ionic Conductivity

A specimen of each of the solid electrolytes was prepared according JIS (Japanese Industrial Standard) R1601. The specimen had the dimension of 3 mm×4 mm×40 mm. Platinum paste was coated on the specimen at locations of 5 mm and 10 mm from the opposite ends of the specimen. Platinum wire was wound on the specimen. Electric current was flown through the platinum wire to measure a resistivity. This measurement was performed by using a dc four-point probe method. An inverse number of the resistivity was determined as an ionic conductivity ($\sigma$), on the assumption that conduction of 100% oxygen ion was made. The ionic conductivity was calculated according to the following equation:

$$\sigma = \text{current (A)} \times \text{cross-sectional area of specimen/voltage (V)} \times \text{effective length of specimen}$$

b) Transference Number

A specimen of each of the solid electrolytes was prepared by shaping the solid electrolyte into a disc having a diameter of 13 mm and a thickness of 1 mm. Pt paste was coated to the opposite surfaces of the disc, and then the paste was dried at 100° C. to form electrodes. The thus prepared specimen was set as a partition wall at the center inside a furnace, dividing the inside the furnace into a fuel electrode side and an air electrode side. The temperature inside the furnace was raised to 600° C. while Ar gas was flown to the fuel electrode side and the air electrode side. Then, flow of Ar gas was stopped, upon which humidified hydrogen was flown to the fuel electrode while air was flown to the air electrode. After allowing the specimen to stand for 30 minutes, spontaneous potential between the anode and the cathode was measured. The transference number was determined as a percentage of the spontaneous potential relative to theoretical spontaneous potential, according to the following equation:

$$\text{Transference number (\%)} = \text{Measured spontaneous potential/Theoretical spontaneous potential} \times 100$$

The total evaluation of the solid electrolytes of Examples and Comparative Examples are achieved under the following standards:
 a) Ionic Conductivity (S/cm)>0.015 (after and before the durability test)
 b) Transference Number$\geq$90%

The total evaluation is A in case that the standards a) and b) are satisfied; the total evaluation is B in case that only one of the standards a) and b) is satisfied; and the total evaluation is C in case that none of the standards a) and b) is satisfied.

As apparent from the test results shown in Tables, in case of the solid electrolytes in which Ln is singly Yb, Y or Gd, A element is singly Sr, Ba or Ca, and B element is singly Mg or Zn, Hall effect is high so as to largely lower the transference number when x, y and z are not less than 0.05, whereas vacancy which do not transport ions increase so as to lower the ionic conductivity when x, y and z exceed 0.15.

In case of the solid electrolytes in which Ln is at least two of Y, Gd, Sm and Nd, A element is at least two of Sr, Ba and Ca, and B element is Mg and Zn, Hall effect is high so as to largely lower the transference number when x, y and z is less than 0.05, whereas vacancy which do not transport ions increases so as to lower the ionic conductivity when x and y exceed 0.15 and when z exceeds 0.25.

Additionally, the test results shown in Tables reveal the following facts: Solid phase reaction is insufficient when firing is conducted at a temperature lower than 1100° C., whereas there are particles which make their sintering when firing is conducted at a temperature higher that 1200° C. so that structure becomes ununiform. Additionally, solid phase reaction is insufficient when firing is conducted for a time shorter than 2 hours, whereas grain growth unavoidably occurs when firing is conducted for a time longer than 10 hours.

Further, sintering is insufficient so that vacancy is left in the solid electrolyte when the sintering is conducted at a temperature lower than 1350° C., whereas sintering excessively proceeds so as to occur inter-granular crack when the sintering is conducted at a temperature higher than 1550° C. Sintering is insufficient so that vacancy is left in the solid electrolyte when the sintering is conducted for a time shorter than 2 hours, whereas sintering excessively proceeds so as to occur inter-granular crack when the sintering is conducted for a time longer than 8 hours.

As appreciated from the above, the solid electrolyte according to the present invention is sufficiently active at a low temperature around 600° C., high in ionic conductivity while being able to prevent Hall effect from decreasing thereby improving transference number. By the production method according to the present invention, the solid electrolyte of the present invention can be effectively and economically produced. Additionally, by using the solid electrolyte of the present invention in a fuel cell, a container main body of the fuel cell can be formed of metal material such as ferrite stainless steel and therefore becomes low in production cost.

The entire contents of Japanese Patent Applications P11-243819 (filed Aug. 30, 1999) and P11-308537 (filed Oct. 29, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

TABLE 1

|  | Example 1 | Example 2 | Example 3 | Example 4 | Example 5 | Example 6 | Example 7 | Example 8 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Gd | Gd | Yb | Yb | Y | Y | Gd + Y | Y + Yb |
| Ratio of x | 0.05 | 0.1 | 0.08 | 0.15 | 0.05 | 0.1 | 0.05 | 0.1 |
| Kind of A | Sr | Sr | Sr | Sr | Sr | Sr | Sr | Sr |
| Ratio of y | 0.1 | 0.1 | 0.1 | 0.1 | 0.1 | 0.1 | 0.1 | 0.1 |
| Kind of B | Mg | Mg | Mg | Mg | Mg | Mg | Mg | Mg |
| Ratio of z | 0.2 | 0.2 | 0.2 | 0.2 | 0.2 | 0.2 | 0.2 | 0.2 |
| Firing and synthesizing | | | | | | | | |
| Firing temp. (° C.) | 1150 | 1150 | 1150 | 1150 | 1150 | 1150 | 1150 | 1150 |
| Firing time (hr.) | 4 | 4 | 4 | 4 | 4 | 4 | 4 | 4 |
| Firing atmosphere | Atm. | Atm. | Atm. | Atm. | Atm. | Atm. | Atm. | Atm. |
| Sintering | | | | | | | | |
| Sintering temp. (° C.) | 1450 | 1450 | 1450 | 1450 | 1450 | 1450 | 1450 | 1450 |
| Sintering time (hr.) | 6 | 6 | 6 | 6 | 6 | 6 | 6 | 6 |
| Sintering atmosphere | Atm. | Atm. | Atm. | Atm. | Atm. | Atm. | Atm. | Atm. |
| Mean diameter (μm) after sintering | 5 | 5 | 5 | 5 | 6 | 6 | 5 | 5 |
| Characteristic values | | | | | | | | |
| At initial period | | | | | | | | |
| Ionic conductivity (S/cm) 600° C.) | 0.018 | 0.018 | 0.018 | 0.018 | 0.018 | 0.018 | 0.017 | 0.018 |
| Transference number (%) | 90 | 91 | 90 | 91 | 90 | 91 | 91 | 90 |
| After durability test | | | | | | | | |
| Ionic conductivity (S/cm) 600° C.) | 0.018 | 0.018 | 0.018 | 0.018 | 0.018 | 0.018 | 0.017 | 0.018 |
| Transference number (%) | 90 | 90 | 90 | 90 | 90 | 90 | 91 | 90 |
| Total evaluation | A | A | A | A | A | A | A | A |

|  | Example 9 | Example 10 | Example 11 | Example 12 | Example 13 |
|---|---|---|---|---|---|
| Matrix $La_{1-x-y}Ln_xA_yGa_{1-z}B_zO_{3-0.5(x+y+z)}$ | | | | | |
| Kind of Ln | Y + Yb | Gd + Yb | Gd + Yb | Gd + Y + Yb | Gd + Y + Yb |
| Ratio of x | 0.15 | 0.05 | 0.15 | 0.05 | 0.1 |
| Kind of A | Sr | Sr | Sr | Sr | Sr |
| Ratio of y | 0.1 | 0.1 | 0.1 | 0.1 | 0.1 |
| Kind of B | Mg | Mg | Mg | Mg | Mg |
| Ratio of z | 0.2 | 0.2 | 0.2 | 0.2 | 0.2 |
| Firing and synthesizing | | | | | |
| Firing temp. (° C.) | 1150 | 1150 | 1150 | 1150 | 1150 |
| Firing time (hr.) | 4 | 4 | 4 | 4 | 4 |
| Firing atmosphere | Atm. | Atm. | Atm. | Atm. | Atm. |
| Sintering | | | | | |
| Sintering temp. (° C.) | 1450 | 1450 | 1450 | 1450 | 1450 |
| Sintering time (hr.) | 6 | 6 | 6 | 6 | 6 |
| Sintering atmosphere | Atm. | Atm. | Atm. | Atm. | Atm. |
| Mean diameter (μm) after sintering | 5 | 5 | 5 | 5 | 5 |
| Characteristic values | | | | | |
| At initial period | | | | | |
| Ionic conductivity (S/cm) 600° C.) | 0.018 | 0.018 | 0.018 | 0.018 | 0.018 |
| Transference number (%) | 91 | 90 | 91 | 90 | 91 |
| After durability test | | | | | |
| Ionic conductivity (S/cm) 600° C.) | 0.018 | 0.018 | 0.018 | 0.018 | 0.018 |
| Transference number (%) | 90 | 90 | 90 | 90 | 90 |
| Total evaluation | A | A | A | A | A |

TABLE 2

|  | Example 14 | Example 15 | Example 16 | Example 17 | Example 18 | Example 19 | Example 20 | Example 21 | Example 22 |
|---|---|---|---|---|---|---|---|---|---|
| Matrix $La_{1-x-y}Ln_xA_yGa_{1-z}B_zO_{3-0.5(x+y+z)}$ | | | | | | | | | |
| Kind of Ln | Sm | Sm | Nd | Nd | Gd + Sm | Gd + Nd | Y + Sm | Y + Sm | Sm + Nd |
| Ratio of x | 0.05 | 0.1 | 0.08 | 0.15 | 0.05 | 0.1 | 0.05 | 0.05 | 0.05 |
| Kind of A | Sr | Sr | Sr | Sr | Sr | Sr | Sr | Sr | Sr |
| Ratio of y | 0.1 | 0.1 | 0.1 | 0.1 | 0.1 | 0.1 | 0.1 | 0.1 | 0.1 |
| Kind of B | Mg | Mg | Mg | Mg | Mg | Mg | Mg | Mg | Mg |
| Ratio of z | 0.2 | 0.2 | 0.2 | 0.2 | 0.2 | 0.2 | 0.2 | 0.2 | 0.2 |
| Firing and synthesizing | | | | | | | | | |
| Firing temp. (° C.) | 1150 | 1150 | 1150 | 1150 | 1150 | 150 | 1150 | 1150 | 1150 |
| Firing time (hr.) | 4 | 4 | 4 | 4 | 4 | 4 | 4 | 4 | 4 |
| Firing atmosphere | Atm. | Atm. | Atm. | Atm. | Atm. | Atm. | Atm. | Atm. | Atm. |
| Sintering | | | | | | | | | |
| Sintering temp. (° C.) | 1450 | 1450 | 1450 | 1450 | 1450 | 1450 | 1450 | 1450 | 1450 |
| Sintering time (hr.) | 6 | 6 | 6 | 6 | 6 | 6 | 6 | 6 | 6 |
| Sintering atmosphere | Atm. | Atm. | Atm. | Atm. | Atm. | Atm. | Atm. | Atm. | Atm. |
| Mean diameter ($\mu$m) after sintering | 5 | 5 | 5 | 5 | 6 | 6 | 5 | 5 | 5 |
| Characteristic values | | | | | | | | | |
| At initial period | | | | | | | | | |
| Ionic conductivity (S/cm) 600° C.) | 0.018 | 0.018 | 0.018 | 0.018 | 0.018 | 0.018 | 0.017 | 0.017 | 0.017 |
| Transference number (%) | 90 | 91 | 90 | 91 | 90 | 91 | 91 | 91 | 91 |
| After durability test | | | | | | | | | |
| Ionic conductivity (S/cm) 600° C.) | 0.018 | 0.018 | 0.018 | 0.018 | 0.018 | 0.018 | 0.017 | 0.017 | 0.017 |
| Transference number (%) | 90 | 90 | 90 | 90 | 90 | 90 | 91 | 91 | 91 |
| Total evaluation | A | A | A | A | A | A | A | A | A |

TABLE 3

|  | Comp. example 1 | Comp. example 2 | Comp. example 3 | Comp. example 4 | Comp. example 5 | Comp. example 6 | Comp. example 7 | Comp. example 8 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Gd | Gd | Yb | Y | Gd + Y | Gd + Y | Gd + Y + Yb | Nil |
| Ratio of x | 0.03 | 0.2 | 0.2 | 0.2 | 0.03 | 0.2 | 0.2 | — |
| Kind of A | Sr | Sr | Sr | Sr | Sr | Sr | Sr | Sr |
| Ratio of y | 0.1 | 0.1 | 0.1 | 0.1 | 0.1 | 0.1 | 0.1 | 0.1 |
| Kind of B | Mg | Mg | Mg | Mg | Mg | Mg | Mg | Nil |
| Ratio of z | 0.2 | 0.2 | 0.2 | 0.2 | 0.2 | 0.2 | 0.2 | — |
| Firing and synthesizing | | | | | | | | |
| Firing temp. (° C.) | 1150 | 1150 | 1150 | 1150 | 1150 | 1150 | 1150 | 1150 |
| Firing time (hr.) | 4 | 4 | 4 | 4 | 4 | 4 | 4 | 4 |
| Firing atmosphere | Atm. | Atm. | Atm. | Atm. | Atm. | Atm. | Atm. | Atm. |
| Sintering | | | | | | | | |
| Sintering temp. (° C.) | 1450 | 1450 | 1450 | 1450 | 1450 | 1450 | 1450 | 1450 |
| Sintering time (hr.) | 6 | 6 | 6 | 6 | 6 | 6 | 6 | 6 |
| Sintering atmosphere | Atm. | Atm. | Atm. | Atm. | Atm. | Atm. | Atm. | Atm. |
| Mean diameter ($\mu$m) after sintering | 5 | 5 | 5 | 6 | 5 | 5 | 5 | 5 |
| Characteristic values | | | | | | | | |
| At initial period | | | | | | | | |
| Ionic conductivity (S/cm) 600° C.) | 0.016 | 0.009 | 0.008 | 0.012 | 0.01 | 0.015 | 0.015 | 0.007 |
| Transference number (%) | 85 | 92 | 92 | 92 | 90 | 92 | 90 | 85 |
| After durability test | | | | | | | | |
| Ionic conductivity (S/cm) 600° C.) | 0.014 | 0.008 | 0.008 | 0.012 | 0.01 | 0.015 | 0.015 | 0.007 |
| Transference number (%) | 82 | 91 | 91 | 91 | 82 | 91 | 90 | 85 |
| Total evaluation | C | B | B | C | C | B | C | C |

TABLE 3-continued

| | Comp. example 9 | Comp. example 10 | Comp. example 11 | Comp. example 12 | Comp. example 13 |
|---|---|---|---|---|---|
| Matrix $La_{1-x-y}Ln_xA_yGa_{1-z}B_zO_{3-0.5(x+y+z)}$ | | | | | |
| Kind of Ln | Nil | Nil | Sm | Sm | Nd |
| Ratio of x | — | — | 0.03 | 0.2 | 0.2 |
| Kind of A | Nil | Nil | Sr | Sr | Sr |
| Ratio of y | — | — | 0.1 | 0.1 | 0.1 |
| Kind of B | Mg | Nil | Mg | Mg | Mg |
| Ratio of z | 0.2 | — | 0.2 | 0.2 | 0.2 |
| Firing and synthesizing | | | | | |
| Firing temp. (° C.) | 1150 | 1150 | 1150 | 1150 | 1150 |
| Firing time (hr.) | 4 | 4 | 4 | 4 | 4 |
| Firing atmosphere | Atm. | Atm. | Atm. | Atm. | Atm. |
| Sintering | | | | | |
| Sintering temp. (° C.) | 1450 | 1450 | 1450 | 1450 | 1450 |
| Sintering time (hr.) | 6 | 6 | 6 | 6 | 6 |
| Sintering atmosphere | Atm. | Atm. | Atm. | Atm. | Atm. |
| Mean diameter (μm) after sintering | 5 | 5 | 5 | 5 | 5 |
| Characteristic values | | | | | |
| At initial period | | | | | |
| Ionic conductivity (S/cm) 600° C.) | 0.007 | 0.000005 | 0.016 | 0.009 | 0.008 |
| Transference number (%) | 80 | 80 | 85 | 92 | 92 |
| After durability test | | | | | |
| Ionic conductivity (S/cm) 600° C.) | 0.007 | 0.000005 | 0.014 | 0.009 | 0.008 |
| Transference number (%) | 80 | 80 | 82 | 91 | 91 |
| Total evaluation | C | C | B | B | B |

TABLE 4

| | Example 23 | Example 24 | Example 25 | Example 26 | Example 27 | Example 28 | Example 29 | Example 30 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Gd | Gd | Gd | Gd | Gd | Gd | Gd | Gd |
| Ratio of x | 0.1 | 0.1 | 0.1 | 0.1 | 0.1 | 0.1 | 0.1 | 0.1 |
| Kind of A | Sr | Sr | Sr | Ba | Ca | Sf + Ba | Ca + Ba | Sr + Ca |
| Ratio of y | 0.05 | 0.1 | 0.15 | 0.1 | 0.1 | 0.1 | 0.15 | 0.15 |
| Kind of B | Mg | Mg | Mg | Mg | Mg | Mg | Mg | Mg |
| Ratio of z | 0.2 | 0.2 | 0.2 | 0.2 | 0.2 | 0.2 | 0.2 | 0.2 |
| Firing and synthesizing | | | | | | | | |
| Firing temp. (° C.) | 1150 | 1150 | 1150 | 1150 | 1150 | 1150 | 1150 | 1150 |
| Firing time (hr.) | 4 | 4 | 4 | 4 | 4 | 4 | 4 | 4 |
| Firing atmosphere | Atm. | Atm. | Atm. | Atm. | Atm. | Atm. | Atm. | Atm. |
| Sintering | | | | | | | | |
| Sintering temp. (° C.) | 1450 | 1450 | 1450 | 1450 | 1450 | 1450 | 1450 | 1450 |
| Sintering time (hr.) | 6 | 6 | 6 | 6 | 6 | 6 | 6 | 6 |
| Sintering atmosphere | Atm. | Atm. | Atm. | Atm. | Atm. | Atm. | Atm. | Atm. |
| Mean diameter (μm) after sintering | 5 | 5 | 5 | 6 | 5 | 6 | 6 | 5 |
| Characteristic values | 0.018 | 0.018 | 0.018 | 0.018 | 0.018 | 0.018 | 0.018 | 0.018 |
| At initial period | | | | | | | | |
| Ionic conductivity (S/cm) 600° C.) Transference number (%) | 91 | 92 | 90 | 92 | 90 | 91 | 90 | 92 |
| After durability test | | | | | | | | |
| Ionic conductivity (S/cm) 600° C.) | 0.018 | 0.018 | 0.018 | 0.018 | 0.018 | 0.018 | 0.018 | 0.018 |
| Transference number (%) | 90 | 91 | 90 | 91 | 90 | 91 | 90 | 90 |
| Total evaluation | A | A | A | A | A | A | A | A |

TABLE 4-continued

|  | Comp. example 14 | Comp. example 15 | Comp. example 16 | Comp. example 17 | Comp. example 18 | Comp. example 19 |
|---|---|---|---|---|---|---|
| Matrix $La_{1-x-y}Ln_xA_yGa_{1-z}B_zO_{3-0.5(x+y+z)}$ | | | | | | |
| Kind of Ln | Gd | Gd | Gd | Gd | Gd | Gd |
| Ratio of x | 0.1 | 0.1 | 0.1 | 0.1 | 0.1 | 0.1 |
| Kind of A | Sr | Sr | Ba | Ba | Si + Ba + Ca | Sr + Ba + Ca |
| Ratio of y | 0.04 | 0.2 | 0.04 | 0.2 | 0.04 | 0.2 |
| Kind of B | Mg | Mg | Mg | Mg | Mg | Mg |
| Ratio of z | 0.2 | 0.2 | 0.2 | 0.2 | 0.2 | 0.2 |
| Firing and synthesizing | | | | | | |
| Firing temp. (° C.) | 1150 | 1150 | 1150 | 1150 | 1150 | 1150 |
| Firing time (hr.) | 4 | 4 | 4 | 4 | 4 | 4 |
| Firing atmosphere | Atm. | Atm. | Atm. | Atm. | Atm. | Atm. |
| Sintering | | | | | | |
| Sintering temp. (° C.) | 1450 | 1450 | 1450 | 1450 | 1450 | 1450 |
| Sintering time (hr.) | 6 | 6 | 6 | 6 | 6 | 6 |
| Sintering atmosphere | Atm. | Atm. | Atm. | Atm. | Atm. | Atm. |
| Mean diameter ($\mu$m) after sintering | 4 | 5 | 6 | 6 | 6 | 6 |
| Characteristic values | | | | | | |
| At initial period | | | | | | |
| Ionic conductivity (S/cm) 600° C.) | 0.01 | 0.012 | 0.012 | 0.01 | 0.01 | 0.01 |
| Transference number (%) | 82 | 90 | 85 | 90 | 85 | 85 |
| After durability test | | | | | | |
| Ionic conductivity (S/cm) 600° C.) | 0.01 | 0.012 | 0.012 | 0.01 | 0.01 | 0.01 |
| Transference number (%) | 82 | 90 | 85 | 90 | 85 | 85 |
| Total evaluation | C | B | C | B | C | C |

TABLE 5

|  | Example 31 | Example 32 | Example 33 | Example 34 | Example 35 | Example 36 | Example 37 |
|---|---|---|---|---|---|---|---|
| Matrix $La_{1-x-y}Ln_xA_yGa_{1-z}B_zO_{3-0.5(x+y+z)}$ | | | | | | | |
| Kind of Ln | Sm | Sm | Nd | Nil | Nd | Sm | Nd |
| Ratio of x | 0.1 | 0.1 | 0.1 | 0.1 | 0.1 | 0.1 | 0.1 |
| Kind of A | Sr | Sr | Ba | Ba | Sr + Ba | Ca + Ba | Sr + Ca |
| Ratio of y | 0.05 | 0.15 | 0.1 | 0.1 | 0.1 | 0.15 | 0.15 |
| Kind of B | Mg | Mg | Mg | Mg | Mg | Mg | Mg |
| Ratio of z | 0.2 | 0.2 | 0.2 | 0.2 | 0.2 | 0.2 | 0.2 |
| Firing and synthesizing | | | | | | | |
| Firing temp. (° C.) | 1150 | 1150 | 1150 | 1150 | 1150 | 1150 | 1150 |
| Firing time (hr.) | 4 | 4 | 4 | 4 | 4 | 4 | 4 |
| Firing atmosphere | Atm. | Atm. | Atm. | Atm. | Atm. | Atm. | Atm. |
| Sintering | | | | | | | |
| Sintering temp. (° C.) | 1450 | 1450 | 1450 | 1450 | 1450 | 1450 | 1450 |
| Sintering time (hr.) | 6 | 6 | 6 | 6 | 6 | 6 | 6 |
| Sintering atmosphere | Atm. | Atm. | Atm. | Atm. | Atm. | Atm. | Atm. |
| Mean diameter ($\mu$m) after sintering | 5 | 5 | 6 | 5 | 6 | 6 | 5 |
| Characteristic values | | | | | | | |
| At initial period | | | | | | | |
| Ionic conductivity (S/cm) 600° C.) | 0.018 | 0.018 | 0.018 | 0.018 | 0.018 | 0.018 | 0.018 |
| Transference number (%) | 91 | 90 | 92 | 90 | 91 | 90 | 92 |
| After durability test | | | | | | | |
| Ionic conductivity (S/cm) 600° C.) | 0.018 | 0.018 | 0.018 | 0.018 | 0.018 | 0.018 | 0.018 |
| Transference number (%) | 90 | 90 | 91 | 90 | 91 | 90 | 90 |
| Total evaluation | A | A | A | A | A | A | A |

TABLE 5-continued

|  | Comp. example 20 | Comp. example 21 | Comp. example 22 | Comp. example 23 | Comp. example 24 |
|---|---|---|---|---|---|
| Matrix $La_{1-x-y}Ln_xA_yGa_{1-z}B_zO_{3-0.5(x+y+z)}$ | | | | | |
| Kind of Ln | Sm | Sm | Nd | Nd | Sm |
| Ratio of x | 0.1 | 0.1 | 0.1 | 0.1 | 0.1 |
| Kind of A | Sr | Sr | Ba | Ba | Sr + Ba + Ca |
| Ratio of y | 0.04 | 0.2 | 0.04 | 0.2 | 0.04 |
| Kind of B | Mg | Mg | Mg | Mg | Mg |
| Ratio of z | 0.2 | 0.2 | 0.2 | 0.2 | 0.2 |
| Firing and synthesizing | | | | | |
| Firing temp. (° C.) | 1150 | 1150 | 1150 | 1150 | 1150 |
| Firing time (hr.) | 4 | 4 | 4 | 4 | 4 |
| Firing atmosphere | Atm. | Atm. | Atm. | Atm. | Atm. |
| Sintering | | | | | |
| Sintering temp. (° C.) | 1450 | 1450 | 1450 | 1450 | 1450 |
| Sintering time (hr.) | 6 | 6 | 6 | 6 | 6 |
| Sintering atmosphere | Atm. | Atm. | Atm. | Atm. | Atm. |
| Mean diameter ($\mu$m) after sintering | 4 | 5 | 6 | 6 | 5 |
| Characteristic values | | | | | |
| At initial period | | | | | |
| Ionic conductivity (S/cm) 600° C.) | 0.01 | 0.012 | 0.012 | 0.01 | 0.01 |
| Transference number (%) | 82 | 90 | 85 | 90 | 85 |
| After durability test | | | | | |
| Ionic conductivity (S/cm) 600° C.) | 0.01 | 0.012 | 0.012 | 0.01 | 0.01 |
| Transference number (%) | 82 | 90 | 85 | 90 | 85 |
| Total evaluation | B | B | B | B | B |

TABLE 6

|  | Example 38 | Example 39 | Example 40 | Example 41 | Example 42 | Example 43 | Example 44 | Example 45 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Gd | Gd | Gd | Gd | Gd | Sm | Sm | Sm |
| Ratio of x | 0.1 | 0.1 | 0.1 | 0.1 | 0.1 | 0.1 | 0.1 | 0.1 |
| Kind of A | Ba | Ba | Ba | Ba | Ba | Ba | Ba | Ba |
| Ratio of y | 0.1 | 0.1 | 0.1 | 0.1 | 0.1 | 0.1 | 0.1 | 0.1 |
| Kind of B | Mg | Mg | Mg | Zn | Mg + Zn | Mg | Mg | Mg |
| Ratio of z | 0.05 | 0.15 | 0.2 | 0.1 | 0.15 | 0.05 | 0.15 | 0.2 |
| Firing and synthesizing | | | | | | | | |
| Firing temp. (° C.) | 1150 | 1150 | 1150 | 1150 | 1150 | 1150 | 1150 | 1150 |
| Firing time (hr.) | 4 | 4 | 4 | 4 | 4 | 4 | 4 | 4 |
| Firing atmosphere | Atm. | Atm. | Atm. | Atm. | Atm. | Atm. | Atm. | Atm. |
| Sintering | | | | | | | | |
| Sintering temp. (° C.) | 1450 | 1450 | 1450 | 1450 | 1450 | 1450 | 1450 | 1450 |
| Sintering time (hr.) | 6 | 6 | 6 | 6 | 6 | 6 | 6 | 6 |
| Sintering atmosphere | Atm. | Atm. | Atm. | Atm. | Atm. | Atm. | Atm. | Atm. |
| Mean diameter ($\mu$m) after sintering | 6 | 5 | 6 | 5 | 6 | 6 | 5 | 6 |
| Characteristic values | | | | | | | | |
| At initial period | | | | | | | | |
| Ionic conductivity (S/cm) 600° C.) | 0.018 | 0.018 | 0.018 | 0.018 | 0.018 | 0.018 | 0.018 | 0.018 |
| Transference number (%) | 91 | 92 | 90 | 90 | 90 | 91 | 92 | 90 |
| After durability test | | | | | | | | |
| Ionic conductivity (S/cm) 600° C.) | 0.018 | 0.018 | 0.018 | 0.018 | 0.018 | 0.018 | 0.018 | 0.018 |
| Transference number (%) | 90 | 91 | 90 | 90 | 90 | 90 | 91 | 90 |
| Total evaluation | A | A | A | A | A | A | A | A |

TABLE 6-continued

|  | Example 46 | Example 47 | Comp. example 25 | Comp. example 26 | Comp. example 27 | Comp. example 28 | Comp. example 29 | Comp. example 30 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Nd | Nd | Gd | Gd | Gd | Sm | Nd | Nd |
| Ratio of x | 0.1 | 0.1 | 0.1 | 0.1 | 0.1 | 0.1 | 0.1 | 0.1 |
| Kind of A | Ba | Ba | Ba | Ba | Ba | Ba | Ba | Ba |
| Ratio of y | 0.1 | 0.1 | 0.1 | 0.1 | 0.1 | 0.1 | 0.1 | 0.1 |
| Kind of B | Zn | Mg + Zn | Mg | Mg | Mg + Zn | Mg | Mg | Mg + Zn |
| Ratio of z | 0.1 | 0.15 | 0.04 | 0.3 | 0.3 | 0.04 | 0.3 | 0.3 |
| Firing and synthesizing | | | | | | | | |
| Firing temp. (° C.) | 1150 | 1150 | 1150 | 1150 | 1150 | 1150 | 1150 | 1150 |
| Firing time (hr.) | 4 | 4 | 4 | 4 | 4 | 4 | 4 | 4 |
| Firing atmosphere | Atm. | Atm. | Atm. | Atm. | Atm. | Atm. | Atm. | Atm. |
| Sintering | | | | | | | | |
| Sintering temp. (° C.) | 1450 | 1450 | 1450 | 1450 | 1450 | 1450 | 1450 | 1450 |
| Sintering time (hr.) | 6 | 6 | 6 | 6 | 6 | 6 | 6 | 6 |
| Sintering atmosphere | Atm. | Atm. | Atm. | Atm. | Atm. | Atm. | Atm. | Atm. |
| Mean diameter ($\mu$m) after sintering | 5 | 6 | 5 | 5 | 5 | 5 | 5 | 5 |
| Characteristic values | | | | | | | | |
| At initial period | | | | | | | | |
| Ionic conductivity (S/cm) 600° C.) | 0.018 | 0.018 | 0.008 | 0.01 | 0.007 | 0.003 | 0.01 | 0.007 |
| Transference number (%) | 90 | 90 | 85 | 90 | 90 | 85 | 90 | 90 |
| After durability test | | | | | | | | |
| Ionic conductivity (S/cm) 600° C.) | 0.018 | 0.018 | 0.018 | 0.018 | 0.018 | 0.003 | 0.01 | 0.007 |
| Transference number (%) | 90 | 90 | 85 | 90 | 90 | 85 | 90 | 90 |
| Total evaluation | A | A | C | C | B | B | B | B |

TABLE 7

|  | Example 48 | Example 49 | Example 50 | Example 51 | Example 52 | Example 53 | Comp. example 31 | Comp. example 32 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Gd | Gd | Gd | Gd | Gd | Gd | Gd | Gd |
| Ratio of x | 0.1 | 0.1 | 0.1 | 0.1 | 0.1 | 0.1 | — | 0.1 |
| Kind of A | Ba | Ba | Ba | Ba | Ba | Ba | Ba | Ba |
| Ratio of y | 0.1 | 0.1 | 0.1 | 0.1 | 0.1 | 0.1 | 0.1 | 0.1 |
| Kind of B | Mg | Mg | Mg | Mg | Mg | Mg | Mg | Mg |
| Ratio of z | 0.2 | 0.2 | 0.2 | 0.2 | 0.2 | 0.2 | 0.2 | 0.2 |
| Firing and synthesizing | | | | | | | | |
| Firing temp. (° C.) | 1100 | 1150 | 1200 | 1150 | 1150 | 1150 | 1000 | 1050 |
| Firing time (hr.) | 8 | 4 | 2 | 4 | 4 | 4 | 20 | 12 |
| Firing atmosphere | Atm. | Atm. | Atm. | Atm. | Atm. | Atm. | Atm. | Atm. |
| Mean diameter ($\mu$m) before sintering | 0.6 | 0.6 | 0.6 | 0.6 | 0.6 | 0.6 | 0.6 | 0.6 |
| Sintering | | | | | | | | |
| Sintering temp. (° C.) | 1450 | 1450 | 1450 | 1450 | 1450 | 1500 | 1450 | 1450 |
| Sintering time (hr.) | 6 | 6 | 6 | 6 | 6 | 2 | 6 | 6 |
| Sintering atmosphere | Atm. | Atm. | Atm. | Atm. | Atm. | Atm. | Atm. | Atm. |
| Mean diameter ($\mu$m) after sintering | 5 | 5 | 5 | 4 | 8 | 10 | 5 Crack formed | 5 Crack formed |
| Characteristic values | | | | | | | | |
| At initial period | | | | | | | | |
| Ionic conductivity (S/cm) 600° C.) | 0.018 | 0.018 | 0.018 | 0.018 | 0.018 | 0.018 | — | — |
| Transference number (%) | 92 | 92 | 92 | 92 | 92 | 92 | — | — |

TABLE 7-continued

| | | | | | | | | |
|---|---|---|---|---|---|---|---|---|
| After durability test | | | | | | | | |
| Ionic conductivity (S/cm) 600° C.) | 0.018 | 0.018 | 0.018 | 0.018 | 0.018 | 0.018 | — | — |
| Transference number (%) | 92 | 92 | 92 | 91 | 92 | 92 | — | — |
| Total evaluation | A | A | A | A | A | A | C | C |

| | | Comp. example 33 | Comp. example 34 | Comp. example 35 | Comp. example 36 | Comp. example 37 | Comp. example 38 |
|---|---|---|---|---|---|---|---|
| Matrix $La_{1-x-y}Ln_xA_yGa_{1-z}B_zO_{3-0.5(x+y+z)}$ | | | | | | | |
| | Kind of Ln | Gd | Gd | Gd | Gd | Gd | Gd |
| | Ratio of x | 0.1 | 0.1 | 0.1 | 0.1 | 0.1 | 0.1 |
| | Kind of A | Ba | Ba | Ba | Ba | Ba | Ba |
| | Ratio of y | 0.1 | 0.1 | 0.1 | 0.1 | 0.1 | 0.1 |
| | Kind of B | Mg | Mg | Mg | Mg | Mg | Mg |
| | Ratio of z | 0.2 | 0.2 | 0.2 | 0.2 | 0.2 | 0.2 |
| Firing and synthesizing | | | | | | | |
| | Firing temp. (° C.) | 1250 | 1150 | 1150 | 1150 | 1150 | 1150 |
| | Firing time (hr.) | 4 | 4 | 4 | 4 | 4 | 4 |
| | Firing atmosphere | Atm. | Atm. | Atm. | Atm. | Atm. | Atm. |
| | Mean diameter (μm) before sintering | 0.6 | 0.6 | 0.6 | 0.3 | 1.5 | 0.6 |
| Sintering | | | | | | | |
| | Sintering temp. (° C.) | 1450 | 1300 | 1550 | 1450 | 1450 | 1350 |
| | Sintering time (hr.) | 6 | 15 | 1 | 10 | 2 | 10 |
| | Sintering atmosphere | Atm. | Atm. | Atm. | Atm. | Atm. | Atm. |
| | Mean diameter (μm) after sintering | 5 Pore formed | 1.5 Pore formed | 20 Crack formed | 2 | 10 Crack formed | 2 Crack formed |
| Characteristic values | | | | | | | |
| At initial period | | | | | | | |
| | Ionic conductivity (S/cm) 600° C.) | — | — | — | 0.014 | — | — |
| | Transference number (%) | — | — | — | 84 | — | — |
| After durability test | | | | | | | |
| | Ionic conductivity (S/cm) 600° C.) | — | — | — | 0.013 | — | — |
| | Transference number (%) | — | — | — | 0.87 | — | — |
| | Total evaluation | C | C | C | C | C | C |

TABLE 8

| | Example 54 | Example 55 | Example 56 | Example 57 | Example 58 | Example 59 | Comp. example 39 | Comp. example 40 |
|---|---|---|---|---|---|---|---|---|
| Matrix $La_{1-x-y}Ln_xA_yGa_{1-z}B_zO_{3-0.5(x+y+z)}$ | | | | | | | | |
| Kind of Ln | Sm | Sm | Sm | Nd | Nd | Nd | Sm | Sm |
| Ratio of x | 0.1 | 0.1 | 0.1 | 0.1 | 0.1 | 0.1 | 0.1 | 0.1 |
| Kind of A | Ba | Ba | Ba | Ba | Ba | Ba | Ba | Ba |
| Ratio of y | 0.1 | 0.1 | 0.1 | 0.1 | 0.1 | 0.1 | 0.1 | 0.1 |
| Kind of B | Mg | Mg | Mg | Mg | Mg | Mg | Mg | Mg |
| Ratio of z | 0.2 | 0.2 | 0.2 | 0.2 | 0.2 | 0.2 | 0.2 | 0.2 |
| Firing and synthesizing | | | | | | | | |
| Firing temp. (° C.) | 1100 | 1150 | 1200 | 1150 | 1150 | 1150 | 1050 | 1250 |
| Firing time (hr.) | 8 | 4 | 2 | 4 | 4 | 4 | 12 | 1 |
| Firing atmosphere | Atm. | Atm. | Atm. | Atm. | Atm. | Atm. | Atm. | Atm. |
| Mean diameter (μm) before sintering | 0.6 | 0.6 | 0.6 | 0.6 | 0.6 | 0.6 | 0.6 | 0.6 |
| Sintering | | | | | | | | |
| Sintering temp. (° C.) | 1450 | 1450 | 1450 | 1400 | 1450 | 1500 | 1450 | 1450 |
| Sintering time (hr.) | 6 | 6 | 6 | 8 | 6 | 2 | 6 | 6 |
| Sintering atmosphere | Atm. | Atm. | Atm. | Atm. | Atm. | Atm. | Atm. | Atm. |

TABLE 8-continued

| | | | | | | | |
|---|---|---|---|---|---|---|---|
| Mean diameter (μm) after sintering | 5 | 5 | 5 | 4 | 8 | 10 | 5 Crack formed | 5 Pore formed |
| Characteristic values | | | | | | | | |
| At initial period | | | | | | | | |
| Ionic conductivity (S/cm) 600° C.) | 0.018 | 0.018 | 0.018 | 0.018 | 0.018 | 0.018 | — | — |
| Transference number (%) | 92 | 92 | 92 | 92 | 92 | 92 | — | — |
| After durability test | | | | | | | | |
| Ionic conductivity (S/cm) 600° C.) | 0.018 | 0.018 | 0.018 | 0.018 | 0.018 | 0.018 | — | — |
| Transference number (%) | 92 | 92 | 92 | 91 | 92 | 92 | — | — |
| Total evaluation | A | A | A | A | A | A | C | C |

| | Comp. example 41 | Comp. example 42 | Comp. example 43 | Comp. example 44 |
|---|---|---|---|---|
| Matrix $La_{1-x-y}Ln_xA_yGa_{1-z}B_zO_{3-0.5(x+y+z)}$ | | | | |
| Kind of Ln | Nd | Nd | Nd | Nd |
| Ratio of x | 0.1 | 0.1 | 0.1 | 0.1 |
| Kind of A | Ba | Ba | Ba | Ba |
| Ratio of y | 0.1 | 0.1 | 0.1 | 0.1 |
| Kind of B | Mg | Mg | Mg | Mg |
| Ratio of z | 0.2 | 0.2 | 0.2 | 0.2 |
| Firing and synthesizing | | | | |
| Firing temp. (° C.) | 1150 | 1150 | 1150 | 1150 |
| Firing time (hr.) | 4 | 4 | 4 | 4 |
| Firing atmosphere | Atm. | Atm. | Atm. | Atm. |
| Mean diameter (μm) before sintering | 0.6 | 0.6 | 0.3 | 1.5 |
| Sintering | | | | |
| Sintering temp. (° C.) | 1300 | 1550 | 1450 | 1450 |
| Sintering time (hr.) | 15 | 1 | 10 | 2 |
| Sintering atmosphere | Atm. | Atm. | Atm. | Atm. |
| Mean diameter (μm) after sintering | 1.5 Pore formed | 20 Crack formed | 2 | 10 Crack formed |
| Characteristic values | | | | |
| At initial period | | | | |
| Ionic conductivity (S/cm) 600° C.) | — | — | 0.014 | — |
| Transference number (%) | — | — | 84 | — |
| After durability test | | | | |
| Ionic conductivity (S/cm) 600° C.) | — | — | 0.013 | — |
| Transference number (%) | — | — | 0.87 | — |
| Total evaluation | C | C | B | C |

What is claimed is:

1. A solid electrolyte represented by the following formula:

$$La_{(1-x-y)}Ln_xA_yGa_{(1-z)}B_zO_{3-0.5(x+y+z)}$$

where Ln is at least one rare earth element selected from the group consisting of Y, Yb, Gd, Sm and Nd; A is at least one element selected from the group consisting of Sr, Ba and Ca; B is at least one of Mg and Zn; x is a number ranging from 0.05 to 0.15; y is a number ranging from 0.05 to 0.15; and z is a number ranging from 0.05 to 0.25.

2. A solid electrolyte as claimed in claim 1, wherein said solid electrolyte is formed of particles whose means diameter is within a range of from 2 to 10 μm.

3. A method of producing a solid electrolyte, comprising:
mixing gallium oxide, oxides of rare earth elements, oxide of alkaline earth element, at least one of zinc oxide and magnesium oxide to form a mixture;
firing the mixture at a temperature ranging from 1050 to 1200° C. for a time ranging from 2 to 10 hours to accomplish synthesizing a compound material;
pulverizing the compound material; and
compacting the pulverized compound material; and
sintering the compacting compound material to form the solid electrolyte.

4. A method as claimed in claim 3, wherein the sintering is accomplished at a temperature ranging from 1350 to 1500° C. for a time ranging from 2 to 8 hours.

5. A method as claimed in claim 3, wherein the firing and the sintering are accomplished in air.

6. A method as claimed in claim 3, further comprising adjusting mean diameter of the pulverized compound material within a range of from 0.5 to 0.8 μm, before the sintering.

7. A solid electrolyte represented by the following formula:

$$La_{(1-x-y)}Ln_xA_yGa_{(1-z)}B_zO_{3-0.5(x+y+z)}$$

where Ln is at least one rare earth element selected from the group consisting of Gd, Sm and Nd; A is Ba; B is Mg; x is 0.1; y is 0.1; and z is 0.2, wherein said solid electrolyte is formed of particles whose means diameter is within a range of from 4 to 10 μm, said solid electrolyte being produced by a method comprising:

mixing lanthanum oxide, gallium oxide, oxide of at least one rare earth element selected from the group consisting of Gd, Sm and Nd, barium oxide and magnesium oxide to form a mixture;

firing the mixture in air at a temperature ranging from 1100 to 1200° C. for a time ranging from 2 to 8 hours to accomplish synthesizing a compound material;

pulverizing the compound material;

compacting the pulverized compound material;

adjusting mean diameter of the pulverized compound material within a range of from 0.5 to 0.8 μm; and sintering the compacting compound material in air at a temperature ranging from 1400 to 1500° C. for a time ranging from 2 to 8 hours to form the solid electrolyte.

8. A fuel cell comprising:

a solid electrolyte represented by the following formula:

$$La_{(1-x-y)}Ln_xA_yGa_{(1-z)}B_zO_{3-0.5(x+y+z)}$$

where Ln is at least one rare earth element selected from the group consisting of Y, Yb, Gd, Sm and Nd; A is at least one element selected from the group consisting of Sr, Ba and Ca; B is at least one of Mg and Zn; x is a number ranging from 0.05 to 0.15; y is a number ranging from 0.05 to 0.15; and z is a number ranging from 0.05 to 0.25.

* * * * *